United States Patent
Ito

(10) Patent No.: US 6,901,469 B2
(45) Date of Patent: May 31, 2005

(54) COMMUNICATION CONTROL APPARATUS USING CAN PROTOCOL

(75) Inventor: Hiroaki Ito, Kariya (JP)

(73) Assignee: Denso Corporation, Kariya (JP)

(*) Notice: Subject to any disclaimer, the term of this patent is extended or adjusted under 35 U.S.C. 154(b) by 431 days.

(21) Appl. No.: 10/259,652

(22) Filed: Sep. 30, 2002

(65) Prior Publication Data

US 2003/0070022 A1 Apr. 10, 2003

(30) Foreign Application Priority Data

Oct. 9, 2001 (JP) ........................................ 2001-311418

(51) Int. Cl.⁷ .............................................. G06F 13/14
(52) U.S. Cl. ........................ 710/240; 710/305; 710/116
(58) Field of Search ........................ 710/113–116, 118, 710/240–244, 395, 309, 310

(56) References Cited

U.S. PATENT DOCUMENTS

| | | |
|---|---|---|
| 5,303,348 A | 4/1994 | Botzenhardt et al. |
| 5,483,533 A | 1/1996 | Kuba |
| 6,175,887 B1 * | 1/2001 | Ervin et al. ................. 710/113 |
| 6,510,479 B1 * | 1/2003 | Hao ........................... 710/240 |

FOREIGN PATENT DOCUMENTS

| | | |
|---|---|---|
| JP | A-1-143537 | 6/1989 |
| JP | A-11-163899 | 6/1999 |

\* cited by examiner

*Primary Examiner*—Khanh Dang
(74) *Attorney, Agent, or Firm*—Posz Law Group, PLC

(57) ABSTRACT

A communication control apparatus for performing an arbitration when a collision of frames occurs on a bus has a plurality of message boxes. Each message box stores at least a message for a transmission purpose and an identification code indicative of both a priority degree and a sort thereof. The apparatus determines whether the transmission of the frame is successful, and stops a transmission of bits when the transmission of the frame fails. The apparatus further detects a specific event, which delays the transmission of the frame, and sets a sequence of the message box related to the specific event as a first sequence by selecting any one of the low transmission sequence message boxes instead of the highest transmission sequence message box.

5 Claims, 5 Drawing Sheets

COMMUNICATION CONTROL APPARATUS USING CAN PROTOCOL

CROSS REFERENCE TO RELATED APPLICATION

This application is based on and incorporates herein by reference Japanese Patent Application No. 2001-311418 filed on Oct. 9, 2001.

FIELD OF THE INVENTION

The present invention relates to a communication control apparatus applicable to a communication system, which executes an arbitration when a collision of frames happens to occur on a bus by using identification codes provided at head portions of the frames.

BACKGROUND OF THE INVENTION

As communication protocols which are used many times in local area networks (LANS), especially in-vehicle LANs, a CAN (Controller Area Network) protocol corresponding to one of CSMA/CD systems is proposed in this field.

In this CAN protocol, an SOF (Start Of Frame) code indicative of a start of a frame and an identification (ID) code are applied to a head portion of the frame to be used. This ID code is used to identify which message has been allocated to a succeeding data region. That is, each of communication control apparatus installed in network terminals which constitute a LAN recognizes a start of a frame by receiving an SOF code, and identifies a sort of this frame based upon an ID code.

Also, a communication control apparatus having a frame to be transmitted immediately starts to transmit the frame, if a bus is not under use state. To the contrary, when a bus is under use state, this communication control apparatus starts to transmit the frame after the bus is released (that is, transmission of frame is ended). In a case that there are plural sets of communication control apparatus which want to transmit frames, since these communication control apparatuses commence to transmit these frames at the same time when the bus is released, the frames will collide with each other on this bus.

When such a frame collision occurs, in accordance with the CAN protocol, an arbitration control operation is carried out by employing a method called as a "bit unit non-destruction arbitration," while the arbitration control operation determines that which frame should be processed with a priority by employing the above ID code.

That is, there are a dominant (high priority) and a recessive (low priority) as to signal levels on a bus. In a case that dominants and recessives are transmitted at the same time from a plurality of communication control apparatus, a signal level of the bus becomes dominant. In general, it is so considered that a logic value of a dominant is equal to "0", whereas a logic value of a recessive is equal to "1." Then, SOF codes are dominant in all of frames, ID codes are allocated in such a manner that these ID codes do not own the same logic values among plural communication control apparatus, and an MSB is transmitted as a head.

For instance, as shown in FIG. 4, the following case is considered. That is, an ID code is constituted by 4 bits (ID code of actual CAN protocol is constructed of 11 bits). Three sets of first to third communication control apparatuses start to transmit frames at the same time. The ID code applied to a frame transmitted from the first communication control apparatus is 0001B. The ID code applied to a frame transmitted from the second communication control apparatus is 0010B. The ID code applied to a frame transmitted form the third communication control apparatus is 0100B. In this case, when the first second bits in the ID codes are transmitted, the output (second bit of ID code) of the third communication control apparatus is a recessive (1). However, since a signal level of a bus is a dominant (0), it is so assumed at this time that the third communication control apparatus fails in an arbitration. Thus, this third communication control apparatus stops transmission of the frame. The operation of this third communication control apparatus is transferred to a reception condition.

Similarly, when the first third bit in the ID code, subsequent to the above second bit, is transmitted, the output of the second communication control apparatus is a recessive. However, since a signal level of a bus is a dominant, it is so assumed at this time that the second communication control apparatus fails in an arbitration. Thus, this second communication control apparatus stops to transmit the frame and the operation of this second communication control apparatus is transferred to a reception condition. As a result, the first communication control apparatus may win (succeed) the arbitration, and thus transmits the frame until last.

Thus, in the communication system operating under the CAN protocol, in the case that a plurality of frames are transmitted to a bus at the same time, a communication control apparatus which has transmitted a frame having an ID code whose logic value is the smallest (least) logic value may obtain a transmission right. Then, normally, such an ID code having a higher priority order is allocated to a frame to which a message required for quick response time has been allocated, and even when this frame collides with other frames, this frame may be transmitted with a priority.

On the other hand, in each of the communication apparatus, a plurality of mail boxes are provided. Each of these mail boxes is equipped with a message box used to store therein a message, which is superimposed with a frame so as to be transmitted. It should be understood that while box numbers are applied to the respective mail boxes, an ID code register, a use designation register and also a transmission request register are provided in each of the message boxes.

The ID code register is employed so as to store therein sorts of messages and identification (ID) codes indicative of priority orders of these messages stored in the message register. The use designation register is used to designate a use method (that is, use method of transmission/reception) of a message box. The transmission request register is employed so as to set a transmission request of such a message, which is stored in a transmission-purpose message box (FIG. 5).

Then, in the case that there is a message box which is designated for a reception purpose by a use designation register, a communication control apparatus receives such a frame, the ID code of which is made coincident with the ID code stored in the ID code register of this message box, and then, executes a reception control operation by which a message contained in the received frame is stored into the message register thereof.

On the other hand, in a case that there is a message box which is designated for a transmission purpose by a use designation register, a communication control apparatus executes a transmission control operation in such a manner that a frame is transmitted based upon a storage value (ID code and message) of a message box of a transmission request register, to which a transmission request has been set. It should be noted that when there are plural message boxes to which transmission requests have been set, a transmission control operation is carried out with respect to these message boxes in the order of small box number.

As a result, in the above communication control apparatus, when the number (frequency) of collisions of frames on a bus is increased, transmission waiting time of a message to which an ID code having a lower priority order has been allocated is prolonged. This message will be simply referred to as low-priority degree message. This calling manner may be similarly applied to high-priority degree message. As a result, such a message which has been stored in a message box having a larger box number (that is, transmissions priority order thereof is low) than that of the message box into which this low-priority degree message has been stored cannot be transmitted unless the transmission of the low-priority degree message stored in the message box whose box number is small (that is, transmission priority order is high) is ended, even when such an ID code having the highest priority order has been allocated to the first-mentioned message. There are some possibilities that the transmission of the high-priority degree message, which should be urgently transmitted, is largely delayed.

For example, as shown in FIG. 5, the following in-vehicle LAN for executing a communication control operation based upon the CAN protocol will now be considered, while this in-vehicle LAN is equipped with a sensor ECU 30, a control ECU 32 and an actuator ECU 34. This sensor ECU 30 produces a sensor signal from a detection signal of a sensor and transmits this produced sensor signal. The control ECU 32 produces actuator control signals A and B based upon the received sensor signal, and transmits these produced actuator control signals A and B. The actuator ECU 34 actuates actuators based on the actuator control signals A and B.

It should be noted that in the communication apparatus 32 of the control ECU, since the sensor signal corresponding to the message supplied from the sensor ECU is received, a use designation register of a message box having a box number of "0" is set for a reception purpose. An ID code (0100B) of a sensor signal to be received has been set in an ID code register of this message box. Also, in the communication control apparatus 34 of the actuator ECU, since the actuator control signals A and B corresponding to the message transmitted from the control ECU are received, use designation registers of message boxes having box numbers "0" and "1" are set to reception purposes. ID codes (0010B and 0011B) of the actuator control signals A and B to be received have been set to ID code registers of these message boxes. Thus, ID codes having higher priority degrees are allocated to the actuator control signals A and B, as compared with the sensor signal.

Then, it is so assumed that in the communication control apparatus 30 of the sensor ECU, after a transmission request of a sensor signal has been set to a message box having a box number of "0", malfunction of the sensor is detected before this sensor signal is transmitted. Such a transmission request of a sensor malfunction signal is set to a message box having a box number of "1." It should also be noted that an ID code (0000B) having a top priority degree has been allocated to the sensor malfunction signal in order that a transmission delay caused by losing of an arbitration on a bus does not occur.

Under such a condition, in the communication control apparatus 30 of the sensor ECU, since the transmission process operations are carried out in accordance with the box number sequence, unless the transmission of the sensor signal stored in the message box having the box number of "0" is ended, the sensor malfunction signal stored in the message box having the box number of "1" cannot be transmitted. Moreover, since the transmission request for the actuator control signals A and B having the ID code with the higher priority degree than that of the sensor signal is set to the communication control apparatus 32 of the control ECU, unless the transmissions of these actuator control signals are accomplished, the transmission of the sensor signal cannot be transmitted.

As a result, the transmission of the sensor malfunction signal is furthermore delayed. That is, as shown in FIG. 3B, the sensor malfunction signal, which should be immediately transmitted is transmitted at a final stage among these four signals, so that a large delay will be produced until this sensor malfunction signal reaches the control ECU. In FIGS. 3A and 3B, failure in the arbitration is shown with hatching.

Japanese Laid-open Patent Application No. HEI-1-143537 discloses a communication control apparatus. That is, in the CSMA/CD type communication system, when the above event happens to occur, this communication control apparatus rewrites the codes indicative of the priority degrees in such a manner that as to the message having long waiting time, the priority degree of this message becomes high on the bus.

However, even in this case, the transmission sequence of this message in the same communication control apparatus is not changed, unless the transmissions of all of such messages which have been produced in advance are accomplished. Therefore, the high-priority degree message which is produced later cannot be transmitted, so that the waiting time cannot be sufficiently shortened.

Also, in particular, in the CAN protocol in which identifying operations of messages and setting operations of priority degrees during arbitration are carried out by employing the same ID codes, when a priority degree (that is, ID code) is changed, a sort of message cannot be specified, but also a communication control apparatus provided on the reception side cannot receive this message. As a result, such a priority degree changing method cannot be applied to the communication system using the CAN protocol.

SUMMARY OF THE INVENTION

The present invention has been made to solve the above problems, and therefore has an object to provide a communication control apparatus capable of ensuring that a transmission of a succeeding message having a high priority degree is not delayed even when a preceding message having a low priority degree is present.

According to the present invention, a communication control apparatus for performing an arbitration when a collision of frames occurs on a bus has a plurality of message boxes. Each message box stores at least a message for a transmission purpose and an identification code indicative of both a priority degree of the message and a sort thereof. The apparatus determines whether the transmission of the frame is successful, and stops a transmission of bits subsequent to the present bit when the transmission of the frame fails. The apparatus further detects a specific event, which delays the transmission of the frame, and sets a sequence of the message box related to the specific event as a first sequence by selecting any one of the low transmission sequence message boxes instead of the highest transmission sequence message box.

BRIEF DESCRIPTION OF THE DRAWINGS

For a better understanding of the present invention, reference is made to a detailed description in conjunction with the accompanying drawings, in which.

DETAILED DESCRIPTION OF THE PREFERRED EMBODIMENT

Figures 1A, 1B:
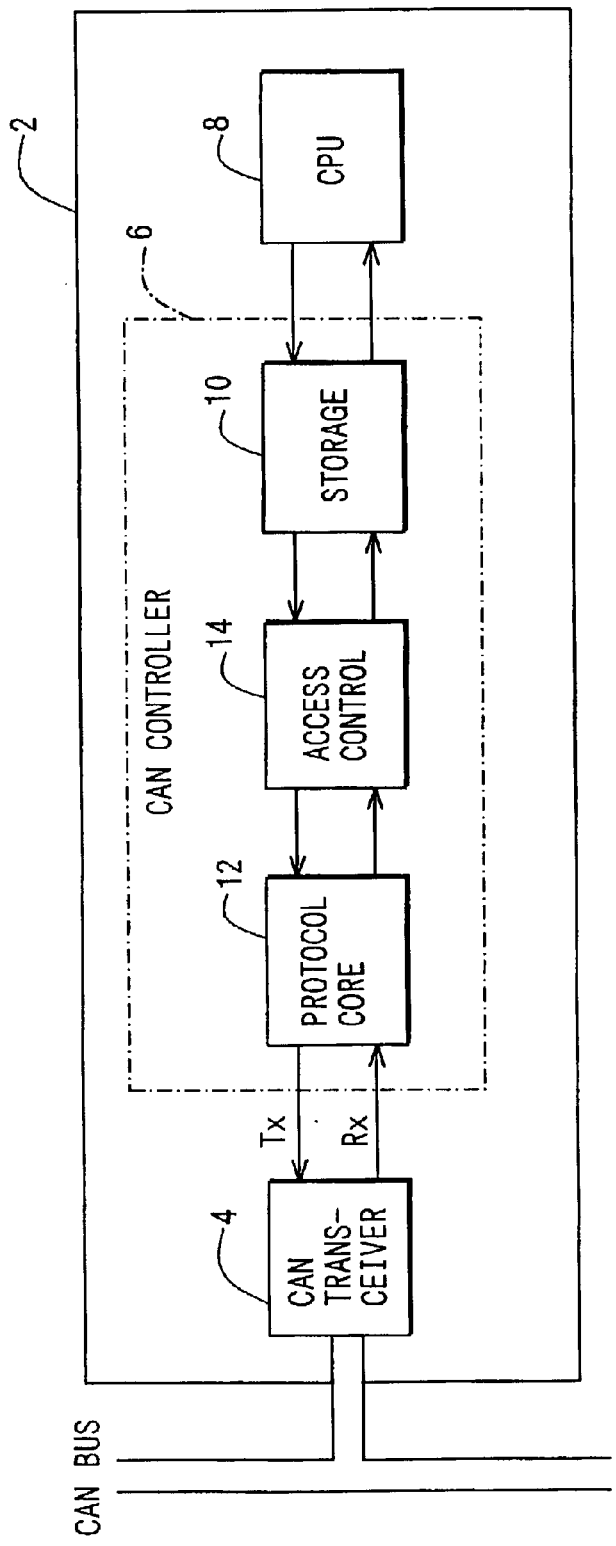
FIG. 1A is a block diagram schematically showing an ECU which constitutes an in-vehicle LAN using a CAN protocol.
FIG. 1B is a table showing details of a message box unit shown in FIG. 1A.

Referring first to FIG. 1A, an ECU (Electronic Control Unit) 2 is connected to an in-vehicle LAN (Local Area Network) using a CAN (Controller Area Network) protocol. The ECU 2 is equipped with a CAN transceiver 4, a CAN controller 6 and a CPU (central Processing Unit) 8. This CAN controller 6 is employed as a communication control apparatus capable of controlling a communication with another ECU in accordance with the LAN protocol. The CAN transceiver 4 transmits and/or receives frames produced by the CAN controller 6 via a LAN bus. The CPU 8 executes various sorts of process operations in conjunction with another ECU by exchanging messages via the CAN controller 6.

The CAN transceiver 4 is arranged in a manner that this CAN transceiver 4 may firmly transmit/receive a signal capable of satisfying a previously defined electric condition of the CAN bus. The CAN controller 6 is provided with a data storage unit 10, a protocol core unit 12 and an access control unit 14. The data storage unit 10 is equipped with a plurality of message boxes used to store therein messages and the like, which are transmitted/received between the ECUs. Those message boxes are shown in FIG. 1B.

The protocol core unit 12 functions as a communication control means. The protocol core unit 12 executes a transmission control operation, by which a message is formed as a frame based upon a stored value of a message box, and then, this message frame is transmitted via the CAN transceiver 4. The protocol core unit 12 executes a signal reception control operation, by which a message frame is received via the CAN transceiver 4 so as to extract a message and the like. The protocol core unit 12 executes an arbitration control (that is, bit-unit non-destruction arbitration) of a bus right in the case that frames collide with each other on the CAN bus. Also, the protocol core unit 12 performs a communication control operation in accordance with the CAN protocol, for instance, detects and notifies an error which occurs in connection with transmission/reception of a frame. Then, the access control unit 14 controls an access to the data storage unit 10 when the protocol core unit 12 executes both the transmission control operation and the reception control operation.

Figure 5:
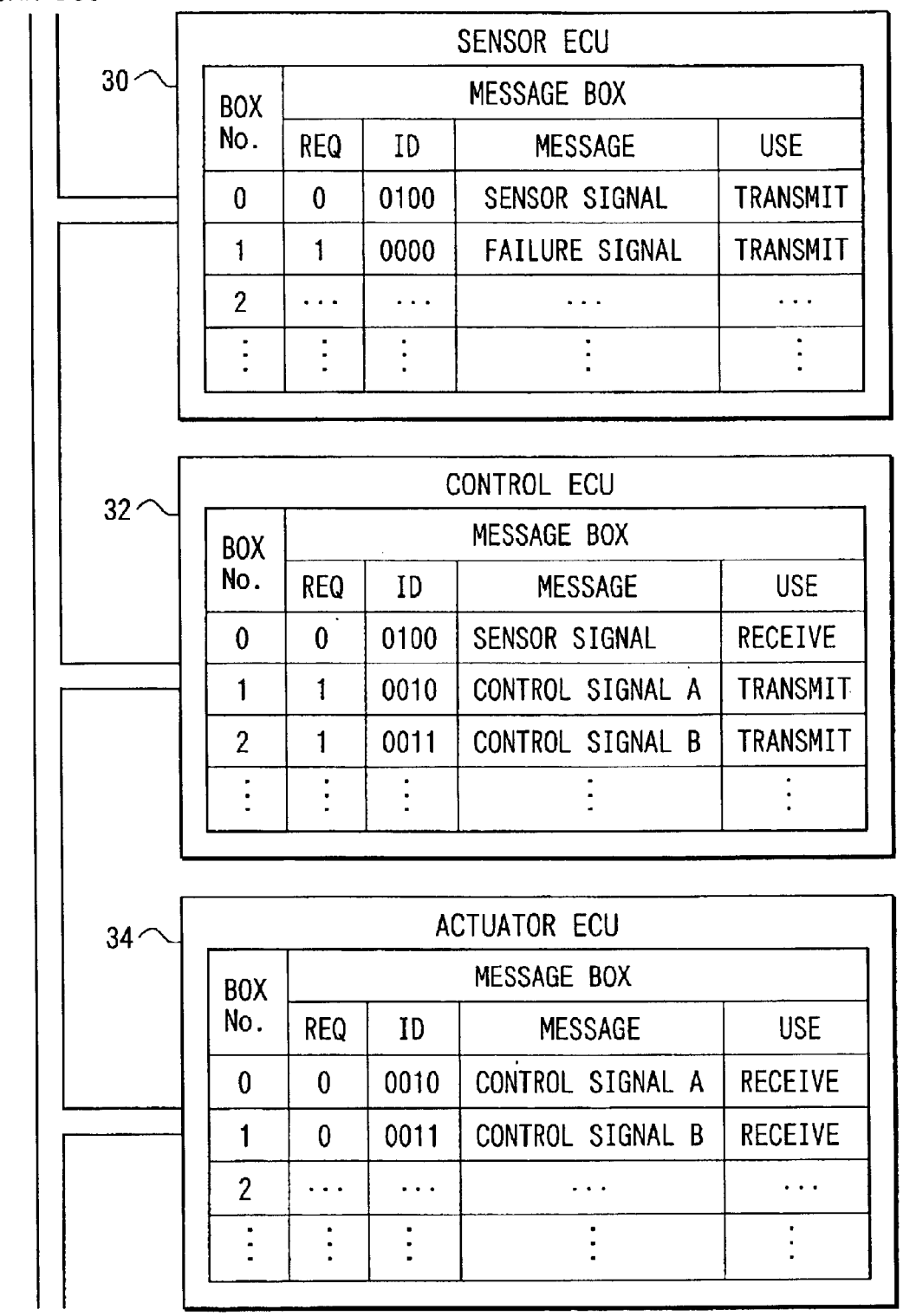
FIG. 5 is an explanatory diagram showing details of the message boxes employed in the communication control apparatus according to the related art.

It should be understood that similar to the communication control apparatus shown in FIG. 5, while box numbers are applied to the respective message boxes employed in the data storage unit 10, a message register, an ID code register, a use designation register. A transmission request register is provided in each of the message boxes. The message register is employed so as to store therein a message, which is superimposed on a frame to be transmitted. The ID code register is employed so as to store therein sorts of messages and identification (ID) codes indicative of priority degrees of these messages stored in the message register. The use designation register is used to designate a use method (that is, use methods of transmission/reception) of a message box. The transmission request register is employed so as to set a transmission request of a message, which is stored in a transmission-purpose message box. In addition to these registers, in this embodiment, a transmission priority setting register for setting a transmission priority is provided with each of these message boxes.

Then, in a case that there is a message which should be transmitted to another ECU, the CPU 8 specifies the ID code corresponding to this message based upon the content of this message, stores these message and ID code into such a message register and an ID code register of a non-used message box, sets a use designation register to a transmission-purpose use designation register, and furthermore sets a transmission request to a transmission request register. More specifically, in the case that this message is required to be urgently transmitted (for example, malfunction information and the like), the CPU 8 sets a priority transmission request register into a transmission request state.

Also, in a case that the CPU 8 receives a notification of receiving a frame from the CAN controller 6 by way of an indication of an interrupt, or a flag, this CPU 8 receives a message from another ECU by reading out a content of a message register of such a message box, in which a use designation register has been set for the reception-purpose register.

On the other hand, in the protocol core unit 12, as the transmission control operation, in the case that there is a message box which is designated for the transmission purpose by a use designation register, the access control unit 14 forms a frame based upon a stored value (that is, ID code and message) of a message box which is selected by a message box selection control operation (will be discussed later). Then, this formed frame is transmitted via the CAN transceiver 4. The frame formed at this time, similar to the related art case, owns an SOF (Start Of Frame) indicative of a start of this frame at a head portion, and an ID code subsequent to this SOF code.

Also, as the reception control operation, in the case that there is such a message box which is designated for the reception purpose by a use designation register, such a frame is received which is made coincident with an ID code stored in an ID code register of this message box, and a message extracted from the received frame is stored via the access control unit 14 into such a message register of the message box whose ID code is made coincident therewith.

In this case, the message box selection control operation which is executed by the access control unit 14 when the protocol core unit 12 executes the transmission control operation will now be explained with reference to a flowchart shown in FIG. 2. It is so assumed that, during the transmission control operation, the protocol core unit 12 determines whether the frame transmission has succeeded or not and also determines that if the frame transmission has failed, it is due to an arbitration failure or not. Then the unit 12 outputs corresponding status signal to the access control unit 14.

Figure 2:
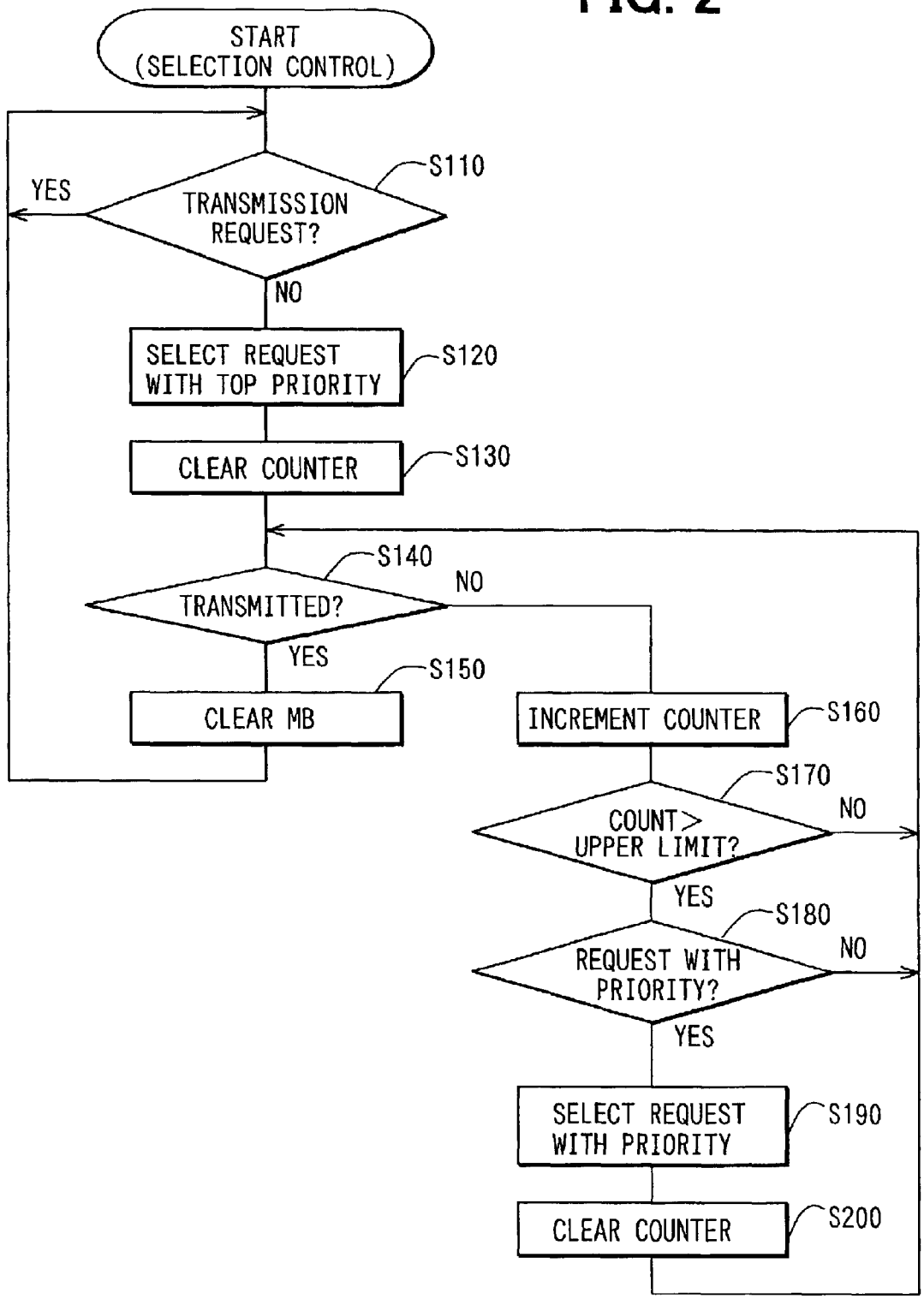
FIG. 2 is a flow chart showing a message box selecting process executed by an access control unit shown in FIG. 1A.

As shown in FIG. 2, in this message box selecting control operation, first of all, the access control unit 14 determines whether a message box is present in which a transmission request register has been set to a transmission request state (step S110). If there is no message box, the access control unit 14 waits until a transmission request is set. Then, in the case that there is even one message box in which a transmission request has been set to a transmission request register, the access control unit 14 sets such a message box having a minimum (least) box number as a message box having a top (highest) priority degree among the message boxes to which the transmission requests have been set.

The access control unit 14 selects this message box having the top priority degree as a message box to be controlled (step S120). Then, the access control unit 14 clears a count content of a resend counter which is used to count a resending time (step S130). As a consequence, the protocol core unit 12 executes the above transmission control operation in accordance with a stored value of the message box to be controlled, which is selected in the step S120.

Next, the access control unit 14 determines whether the protocol core unit 12 succeeded in a transmission of a frame by monitoring a status signal outputted by the protocol core unit 12 (step S140). In the case that it is so confirmed that the protocol core unit 12 succeeded in the frame transmission, the access control unit 14 clears the content of such a message box (MB) selected in the previous step S130 (or step S190) at step S150. Then, this transmission control operation returns to the previous step S110.

On the other hand, when it is so confirmed that the protocol core unit 12 failed in the frame transmission because of a failure in an arbitration, the access control unit 14 increments the content of the resend counter (step S160), and then determines whether this incremented count value is larger than a preset upper limit value (step S170). When this incremented count value is larger than the preset upper limit value, the access control unit 14 determines whether there is such a message box in which a transmission request has been set to a priority transmission request register (step S180).

To the contrary, in a case that the incremented count value is not reached to this preset upper limit value ("NO" in step S170), or there is no message box in which the transmission request has been set to the priority transmission request register ("NO" in step S180), the transmission control operation is returned to the previous step S140. In this case, since the message box to be controlled is not changed, the protocol core unit 12 transmits the frame based upon the stored value of the same message box, that is, retransmits the same message.

In the case that the access control unit 14 determines that the count value of the resend counter is larger than, or equal to the upper limit value ("YES" in step 170), and furthermore, there is a message box in which the transmission request has been set to the priority transmission request register ("YES" in step S180), the access control unit 14 selects such a message box having a minimum (least) box number as a message box to be controlled among message boxes to which priority transmission requests have been set (step S190). The access control unit 14 clears the count value of the resend counter (step S200). Then, the transmission control operation is returned to the previous step S140.

As a consequence, the protocol core unit 12 executes the above transmission control operation in accordance with the stored value of the message box to be controlled, which is selected in the step S190. As a result, the transmission of such a message to which the priority transmission request has been set may be carried out prior to such a message whose transmission fails.

As described above, in the CAN controller 6 according to this embodiment mode, a total time in the case that the transmission of the frame fails due to the failure in the arbitration is counted. When this count value exceeds the upper limit value, the transmission of such a message to which the priority transmission request has been set can be carried out instead of the message whose transmission fails.

As a consequence, in accordance with the CAN controller 6 of this embodiment, even in a case that the message to which the ID code of the low priority degree has been allocated (that is, message with low priority degree) is stored in the message box whose box number is small, and also, the message to which the ID code of the high priority degree has been allocated (that is, message with high priority degree) is stored in the message box whose box number is larger than the above-described small box number, if the message with the low priority degree repeatedly fails in the arbitration, then the transmission sequence is changed. This chance may be given by which the message stored in the message box to which the priority transmission request has been set may be transmitted. As a result, such a message having an urgent transmission request to which the priority transmission has been set can be transmitted without a large delay.

Figure 3A:
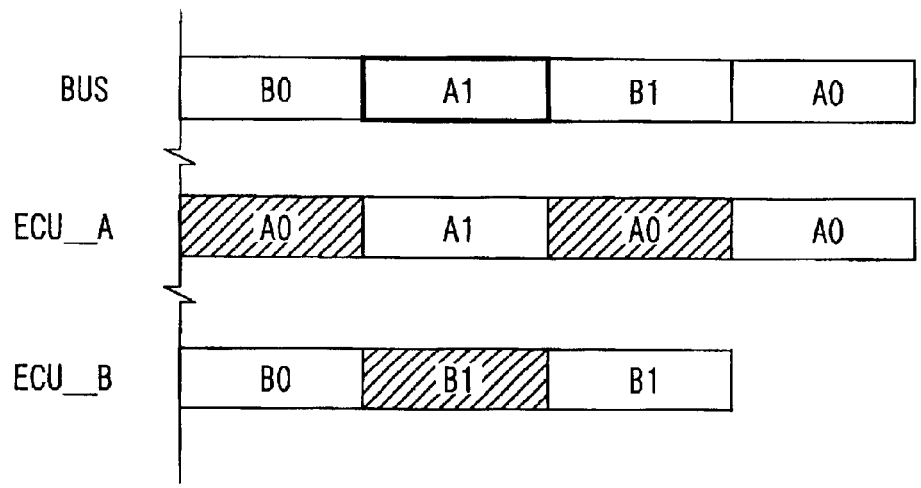
FIG. 3A is a time chart showing effects achieved by a communication control apparatus shown in FIG. 1A.

In this case, FIG. 3A indicates a transmission example of a frame under control of the CAN controller 6 mounted on the ECU 2 according to this embodiment mode. In FIG. 3A, failure in arbitration is indicated with hatching. This transmission example assumes a case that two sets of ECUs (A and B) transmit frames at the same time. That is, it is so assumed that in one ECU (ECU_A), a message A0, the ID code of which is 0100B, is stored in a message box having a box number "0," and another message A1, the ID code of which is 0000B, is stored in a message box having a box number "1." In the other ECU (ECU_B), a message B0, the ID code of which is 0010B, is stored in a message box having a box number "0", and another message B1, the ID code of which is 0011B, is stored in a message box having a box number "1."

That is, priority degrees on the bus are defined as message A1>message B0>message B1>message A0. Also, it is assumed that the message A1 having the top priority degree corresponds to such a message, which should be urgently transmitted, to which the priority transmission request has been set. Also, in this transmission example, it is so assumed that the upper limit value of the resend counter is selected to be "0", and when a transmission of a frame fails even one time (due to failure in arbitration), transmission sequences of frames are rearranged.

As shown in FIG. 3A, first, both messages A0 and B0 are transmitted at the same time, which are stored in the message boxes having the box numbers "0" of both the ECU_A and the ECU_B. As a result, the message B0 having the higher priority degree may win the arbitration, and thus is transmitted until last. When the transmission of this message B0 is accomplished, both the message B1 from the ECU_B and the message A1 from the ECU_A are transmitted at the same time. This message B1 has been stored in the message box having the next box number. The message A1 has been stored in the message box to which the priority transmission request has been set, and is transmitted from the ECU_A which has failed in the arbitration and whose transmission sequence has been rearranged. As a result, the message A1 having the higher priority degree may win the arbitration, and is transmitted until last. When the transmission of this message A1 is ended, both the remaining messages A0 and B1 are transmitted from the ECU_A and the ECU_B at the same time. Then, the message B1 having the higher priority degree may win the arbitration. After the transmission of this message B1 has been accomplished, the message A0 is finally transmitted.

Figure 3B:
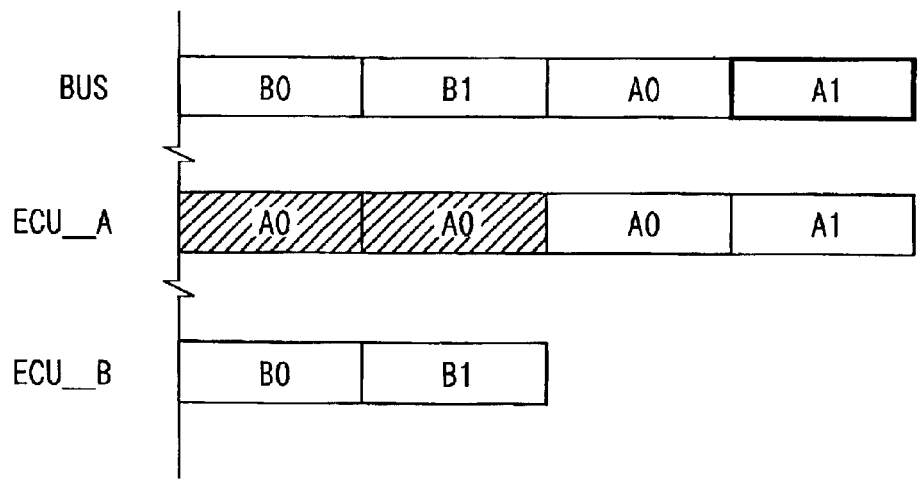
FIG. 3B is a time chart showing problems in an a communication control apparatus according to the related art.
Figure 3C:
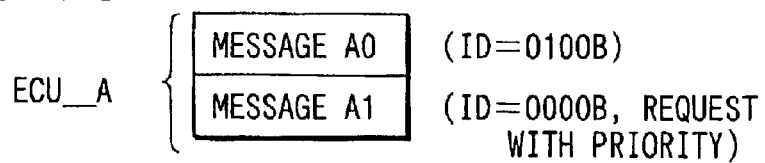
FIG. 3C is an explanatory diagram showing a message box in an ECU_A.
Figure 3D:
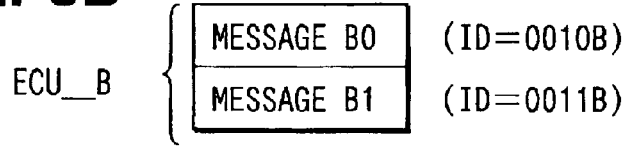
FIG. 3D is an explanatory diagram showing a message box in an ECU_B.
Figure 4:
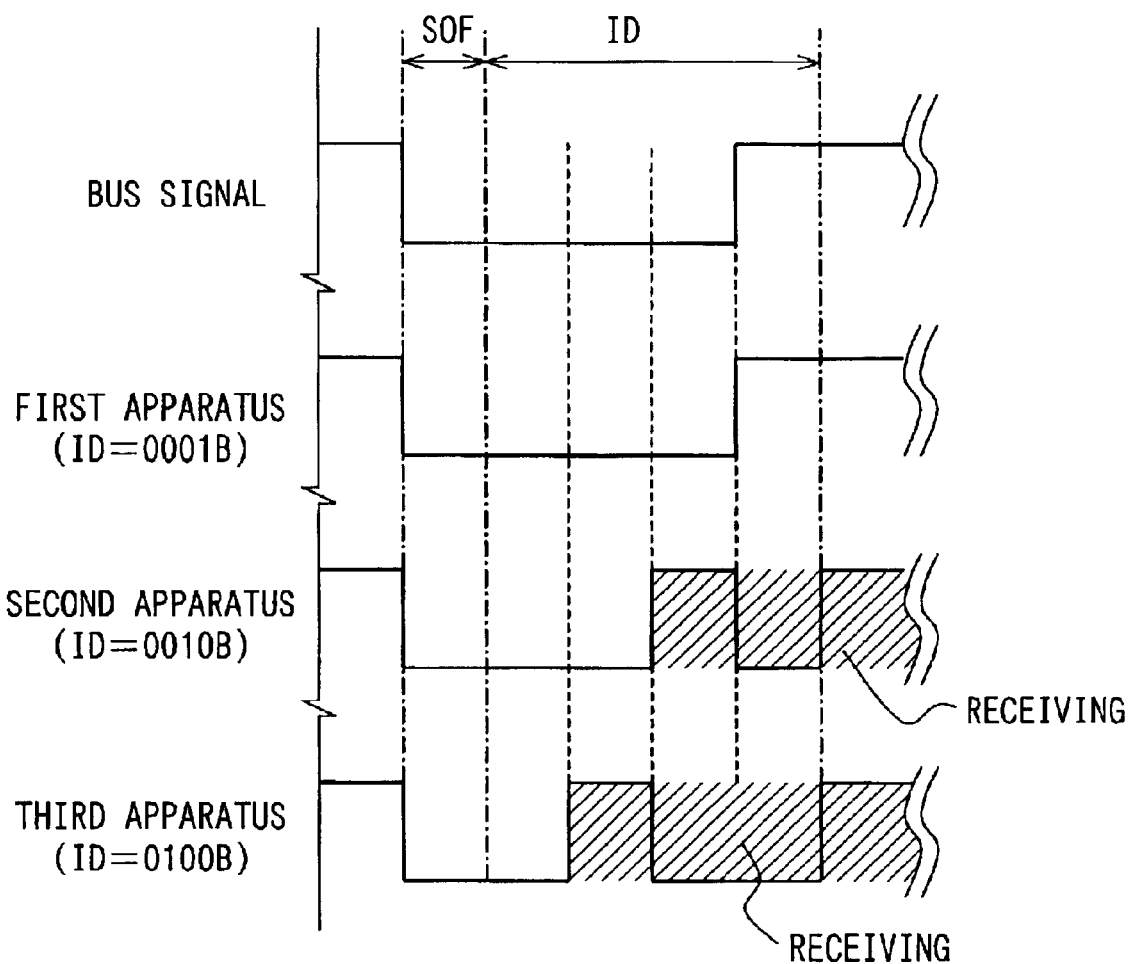
FIG. 4 is a timing chart showing an arbitrating control operation executed in the communication control apparatus according to the related art.

As described above, in the transmission control apparatus according to the related art in which the transmission sequence is not rearranged, as shown in FIG. 3B, the message A1 having the top priority degree is transmitted at the final stage among the four messages. However, in accordance with the transmission control apparatus of this embodiment in which the transmission sequence is rearranged, the message A1 having the top priority degree may be transmitted at the second sequence, which can avoid that the transmission of this message A1 is largely delayed.

It should be noted that the message boxes in which the transmission sequences of the messages are intended to be rearranged are limited to such message boxes that the transmission requests have been set to the priority transmission request registers in this embodiment mode. Alternatively, in a case that there is no message box in which a transmission request has been set to a priority transmission request register, a message box having an ID code with a higher priority degree than that of an ID code which has been stored in the top priority degree message box may be alternatively constituted as a message box whose transmission sequence is intended to be changed.

Alternatively, while a priority transmission request register is omitted, simply, such a message box having an ID code with a higher priority degree than that of an ID code which has been stored in the top priority degree message box may be alternatively constituted as a message box whose transmission sequence is intended to be changed.

Further, the present invention may be implemented in various ways without departing from the spirit of the invention.

What is claimed is:

1. A communication control apparatus for performing an arbitration by employing the identification code when a collision of frames occurs on a bus, the apparatus comprising:

a plurality of message boxes, each message box storing at least a message for a transmission purpose and an identification code indicative of both a priority degree of the message and a sort thereof, the message box further being capable of setting a transmission request;

message box selecting means for selecting a highest transmission sequence message box whose transmission priority degree is the highest degree from the message boxes to which the transmission requests have been set in accordance with transmission priority degrees which have been previously applied to the respective message boxes;

transmission control means for constituting a frame in which the identification code has been applied to a head portion thereof based upon a stored value of the message box selected by the message box selecting means to thereby transmit the constituted frame to a bus, for determining whether the transmission of the frame is succeed by comparing a signal level of the transmitted frame with a signal level appearing on the bus every bit, and for ceasing a transmission of bits subsequent to the present bit when the transmission of the frame fails;

transmission request releasing means for releasing the transmission request of the corresponding message box in a case that the transmission control means succeeded in the transmission of the frame;

specific event detecting means for detecting a specific event which delays the transmission of the frame; and sequence changing means provided with the message box selecting means for setting a sequence of the message box related to the specific event as a first sequence by selecting any one of the low transmission sequence message boxes instead of the highest transmission sequence message box in the case that the specific event is detected by the specific event detecting means, if low transmission sequence message boxes to which the transmission request has been set are present other than the highest transmission sequence message box.

2. The communication control apparatus as in claim 1, wherein the specific event detecting means detects, as the specific event, a failure of the frame transmission by the transmission control means.

3. The communication control apparatus as in claim 1, wherein the specific event detecting means includes a resend counter for counting a total time during which the same message box is resent, and detects, as the specific event, a case that a count value of the resend counter exceeds a present threshold value.

4. The communication control apparatus as in claim 1, further comprising:

priority-transmission requesting means for setting a priority-transmission request to the message box, wherein the sequence changing means exclusively selects, as a message box to be selected, the message box to which the priority-transmission request has been set, in a case that a message box to which the priority-transmission request has been set is present.

5. The communication control apparatus as in claim 1, wherein the communication control means executes a communication in accordance with a CAN (Controller Area Network) protocol.

* * * * *